Figure 5:
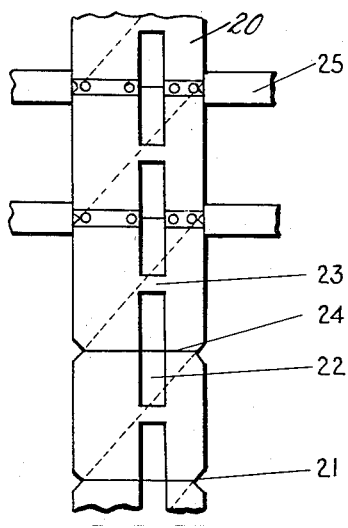
Figure 6:
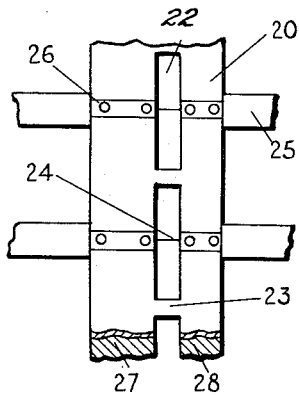

May 29, 1956  D. G. ASHCROFT ET AL  2,747,257
PRODUCTION OF ELECTRIC FUSEHEADS
Filed Oct. 21, 1954  3 Sheets-Sheet 1
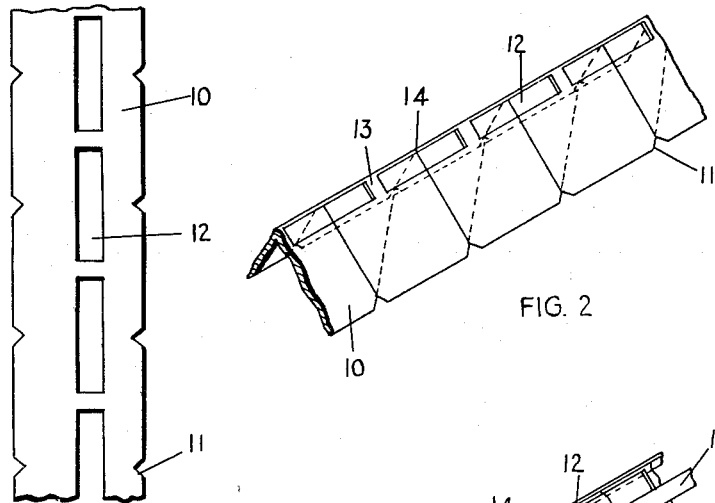
FIG. 1
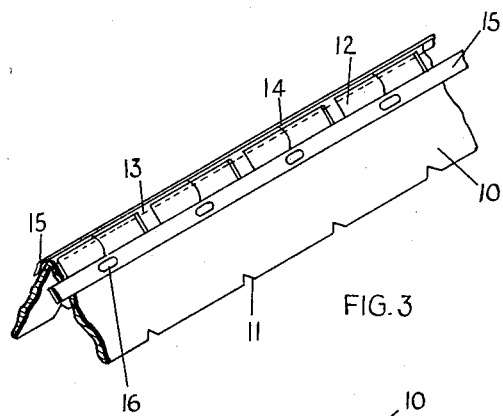
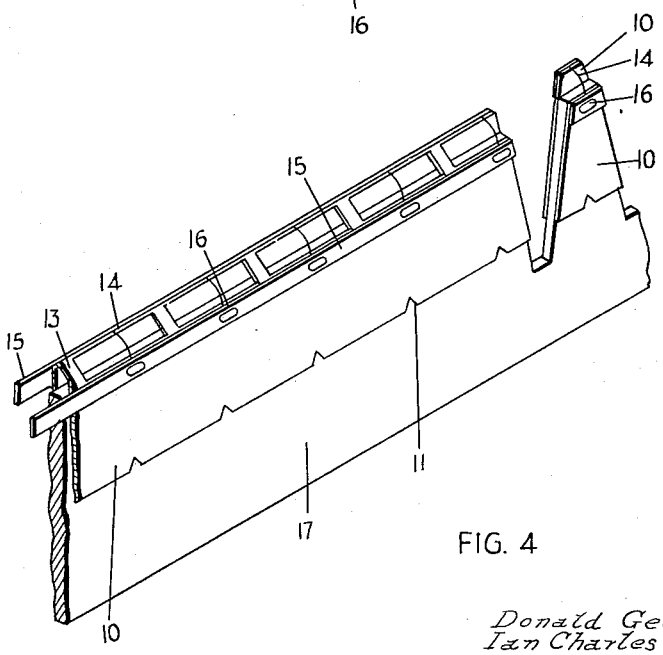
INVENTORS
Donald George Ashcroft
Ian Charles McLean Bell
BY Cushman, Darby & Cushman
ATTORNEYS May 29, 1956  D. G. ASHCROFT ET AL  2,747,257
PRODUCTION OF ELECTRIC FUSEHEADS
Filed Oct. 21, 1954  3 Sheets-Sheet 2

INVENTORS
Donald George Ashcroft
Ian Charles McLean Bell

BY Cushman, Darby & Cushman
ATTORNEYS

May 29, 1956  D. G. ASHCROFT ET AL  2,747,257
PRODUCTION OF ELECTRIC FUSEHEADS
Filed Oct. 21, 1954  3 Sheets-Sheet 3

INVENTORS
Donald George Ashcroft
Ian Charles McLean Bell

BY Cushman, Darby & Cushman
ATTORNEYS

United States Patent Office 2,747,257
Patented May 29, 1956

2,747,257

PRODUCTION OF ELECTRIC FUSEHEADS

Donald George Ashcroft, Saltcoats, and Ian Charles McLean Bell, Glasgow, Scotland, assignors to Imperial Chemical Industries Limited, London, England, a corporation of Great Britain Application October 21, 1954, Serial No. 463,688

Claims priority, application Great Britain December 9, 1953

5 Claims. (Cl. 29—155.5)

The present invention relates to improvements in or relating to the production of electric fuseheads of the kind comprising two metal foil pole pieces separated by a sheet of non-conducting material so that a surface of each foil is united to an opposing surface of the sheet of non-conducting material and having one end of each metal foil pole piece connected together by an electric resistance wire which is embedded in a bead of deflagrating composition and combs of wired teeth therefor.

Electric fuseheads of the aforesaid kind are normally prepared by first cementing two rectangular metallic sheets, which may be, for example, of brass one on each side of a sheet of non-conducting material such as cardboard. This assembly is then cut into two combs wherein the material from the spaces of one comb forms the teeth of the other comb. The teeth of each comb are narrower at their ends than at their root portions. A fine resistance wire is wound round the teeth of each comb and fastened to the sheet of material near the ends of the teeth, for example by soldering, to form a bridge wire at the end of each tooth. The ends of the teeth prior to the application of the fine resistance wire may have the metal sheet and part of the thickness of the cardboard removed at one side to provide the required length of wire between the two metal sheets. The surplus resistance wire passing round the root portion of the teeth is then broken and removed and the combs dipped one or more times in a suitable composition followed by removal of solvent to give a bead of deflagrating composition round the bridge wires after which the teeth are separated by cutting to give the finished fusehead. While this procedure is satisfactory it requires the exercise of a high degree of skill by the operatives and is not readily adaptable for use in a continuous mechanised process.

The object of the present invention is to provide a process for the production of electric fuseheads of the kind which is simpler in operation than the known processes and which is suitable for being carried out in a continuous manner by automatic machinery.

According to the present invention the process for the production of electric fuseheads of the kind comprising two metal foil pole pieces separated by a sheet of non-conducting material so that a surface of each foil is united to an opposing surface of the sheet of non-conducting material and having one end of each metal foil pole piece connected together by an electric resistance wire which is embedded in a bead of deflagrating composition comprises providing a narrow strip of conducting material having along its length a line of rectangularly spaced slots of substantially greater length than width parallel to the edges of the strip, arranging for each slot to have an equal length of resistance wire which passes across its width and has its ends attached to the metal strip and bending said metal strip longitudinally and ultimately to about 180° over at least one strip of insulating material to form a unitary cemented structure with the insulating material, cutting the thus formed unitary structure into a comb of wired teeth, embedding the tip of each wired tooth in at least one deflagrating composition, and thereafter cutting the thus treated comb into individual fuseheads.

The invention also comprises a process for the production of a comb of wired teeth suitable for use in the production of electric fuseheads of the kind comprising two metal foil pole pieces separated by a sheet of non-conducting material so that a surface of each foil is united to an opposing surface of the sheet of non-conducting material and having one end of each metal foil pole piece connected together by an electric resistance wire which is embedded in a bead of deflagrating composition which comprises providing a narrow strip of conducting metal having along its length a line of regularly spaced slots of substantially greater length than width parallel to the edges of the strip, arranging for each slot to have an equal length of resistance wire which passes across its width and has its ends attached to the metal strip and bending said metal strip longitudinally and ultimately to about 180° over at least one strip of insulating material to form a unitary cemented structure with the insulating material, and cutting the thus formed unitary structure into a comb of wired teeth.

Preferably the space which separates two adjacent slots is a narrow one.

It is also desirable to provide the edges of said metal strip with wire positioning notches so positioned with respect to the slots that there is a notch on each side of a slot and that a line joining these two notches bisects the slot at right angles.

In accordance with one embodiment of the process of the invention a thin metal strip is drawn through a first operating position where slots are punched in regular intermittent steps to produce a series of equally spaced slots whose longitudinal axis is parallel to but not necessarily coincident with the longitudinal axis of the metal strip. To assist in the positioning of the wire, notches are punched on the edges of the metal strip during the punching operation for the production of the slots. These notches are so positioned with respect to the slots that there is a notch on each side of a slot and that a line joining these two notches bisects the slot at right angles. The punched strip then enters a second operating position in which a slot is registered in such a position as to enable a thin resistance wire to be wound round the strip so that this wire is held by two opposing notches and passes transversely across the top surface of the metal strip at a position intermediate between the ends of said longitudinal slot. The wire is then passed underneath the strip and, while the strip moves forward a distance equal to that between corresponding portions of successive slots, passed back to the side from which it started and this cycle is repeated as the strip progresses through this position. At the third operating position a pair of insulated leading wires having bared ends is laid on the upper surface of the metal strip so that a bared end of each leading wire covers the resistance wire close to and on each side of the slot. The bared ends are then spot welded or soldered at one or more points to the metal strip thereby permanently uniting to the metal strip the resistance wire in the form of a bridge across the slot. On leaving this third operating position the surplus resistance wire underneath the metal strip is removed for example by means of a suitable brush. At a fourth operating position, at least one sheet of insulating material such as pressboard, mica or the like is cemented to the underside of the metal strip. If only one sheet of insulating material is used it need be only of such a width as at least to cover the space between one edge of the metal strip and a line which includes the longer edges of the slots which are nearer to this edge of the metal strip. If two insulating sheets are used then each of the spaces on the metal strip between each of the lines which include the longer edges of the slots and its nearer edge of the strip can be covered in this way. The metal strip to which the insulating material has been cemented is then passed to the fifth operating position where it is progressively folded along a predetermined line as for instance one which joins the longer edges on one side of the slots so that a cemented structure is formed wherein the insulating material is sandwiched between the surfaces of the folded metal thus formed in the metal strip. The assembly thus formed is then cut into a comb of wired teeth. The combs are then dipped one or more times in a deflagrating composition and, if desired, in a waterproofing composition. The thus treated combs are then cut so as to give completed fuseheads with leading wires attached.

In accordance with a preferred embodiment of the process of the invention a thin metal strip is drawn through a first operating position where slots are punched in regular intermittent steps to produce a series of spaced slots whose longitudinal axis is parallel to but not necessarily coincident with the longitudinal axis of the metal strip. To assist in the positioning of the wire, notches are punched on the edges of the metal strip during the punching operation for the production of the slots. These notches are so positioned with respect to the slots that there is a notch on each side of a slot and that a line joining these two notches bisects the slot at right angles. The punched strip then enters a second operating position where it is bent progressively to an angle of about 45° along a predetermined line, as for instance one which forms the longer edge of one side of the slots. The punched and bent strip then enters a third operating position in which a slot is registered in such a position as to enable a thin resistance wire to be wound round the bent strip so that this wire is held by two opposing notches and passes transversely across the longitudinal slot at a position intermediate between the ends of said slot. The wire is then passed underneath the strip and while the strip moves forward a distance equal to that between corresponding portions of successive slots passed back to the position from which it started and this cycle is repeated as the strip progresses through this position. At the fourth operating position two narrow metallic ribbons are laid on the upper surface of the bent metal strip so that each ribbon covers the resistance wire close to and on each side of the slot and is parallel to the longitudinal axis of the metal strip. Each metallic ribbon where it crosses the resistance wire is spot welded or soldered to the metallic strip thereby permanently uniting to the metal strip the resistance wire in a form of a bridge across the slot. On leaving this fourth operating position the surplus resistance wire underneath the metal strip is removed for example by means of a suitable brush. At a fifth operating position a sheet of insulating material such as pressboard, mica or the like with its two surfaces provided with an adhesive is positioned within the fold of the bent metal strip. The metal strip is then bent to about 180° so that the insulating strip is sandwiched between the two surfaces of the folded metal strip to form a cemented structure. The structure thus formed is then cut into a comb of wired teeth. The combs are then dipped one or more times in a deflagrating composition and if desired in a waterproofing composition. The thus treated combs are then cut so as to give completed fuseheads.

The invention also comprises a machine for carrying out the process of the invention comprising in association strip feeding means, a piercing punch, strip bending means, wire winding mechanism, electric welding means, heat-sealing means, and a comb-cutting punch.

The invention is illustrated with reference to the diagrammatic drawings, Figures 1 to 8, accompanying the specification in which Figures 1 to 4 refer to a preferred embodiment of the invention and Figures 5 to 8 to one of the many alternative embodiments of the invention and with reference to Figure 9 attached hereto which illustrates apparatus suitable for the carrying out of a preferred embodiment of the invention.

In Figures 1 to 4 the metal strip 10 has acute angled slots along its edges and a line of slots 12 recurring regularly along its length. The longitudinal edges of the slots 12 which are nearer to a particular edge of the strip 10 are on the longitudinal axis of the strip 10. The slots 12 are separated by narrow strips 13. The notches 11 are so positioned with respect to the slots 12 that there is a notch 11 on each side of a slot 12 and a line joining the apex of each of the two notches bisects the slot at right angles. The strip 10 is first bent along its longitudinal axis to an angle of 45°. A resistance wire 14 is then wound round the bent strip so that it crosses the middle of the slots and is engaged in the notches 11. Two thin metal strips 15 are then laid along strip 10 in such a way that their nearer edges coincide with the edges of the slots and spot welded to the bent metal strip 10 at points 16 above where the resistance wire passes between the strip 10 and the strip 15. The next operation is the insertion of a pressboard sheet 17, into the fold of the strip 10 followed by further bending and pressing of the strip 10 to give the unitary structure shown on the left hand side of Figure 4 a suitable cement having been applied either to the underside of strip 10 or to both sides of sheet 17. After this pressing the surplus material between the resistance wire bridges is removed by cutting to give a comb structure consisting of teeth as shown at the right hand side of Figure 4. The resistance bridge wires of the comb so obtained are then dipped one or more times in a dope comprising a deflagrating composition in the conventional manner and, if desired, given a waterproof coating and the comb cut into individual fuseheads. Leading wires may thereafter be attached by any suitable method, for example by soldering.

Figure 7:
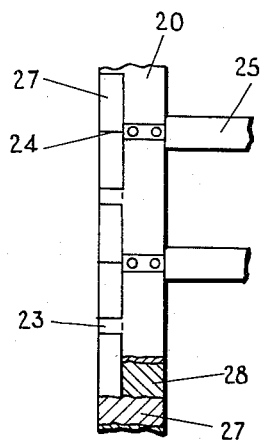
Figure 8:
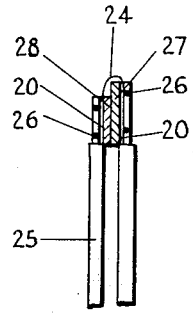

In Figures 5 to 8 which illustrate one alternative embodiment a resistance wire 24 is wound round a strip 20 similar to the strip 10 in Figure 1 so that it engages the notches 21 and crosses above the strip 20 at the middle of the off-centre slots 22. The bared ends of insulated leading wires 25 are then laid on top of the portion of the resistance wire 24 which crosses above the strip 20 and spot welded or soldered to the strip 20 at 26 thereby fastening the wire 24 across the slots 22. Two strips of insulating material 27 and 28 such as pressboard are then cemented to the strip 20 after which the strip 20 is bent as shown in Figure 7 and the strips 27 and 28 cemented together to give a unitary structure, an end view of one of which is shown in Figure 8. These individual units are then dipped in the conventional manner to produce fuseheads. Alternatively the structure of Figure 7 may have part of the surplus material cut out to give a comb-like structure which is dipped in the fusehead composition or compositions after which it is cut into individual units.

Figure 9:
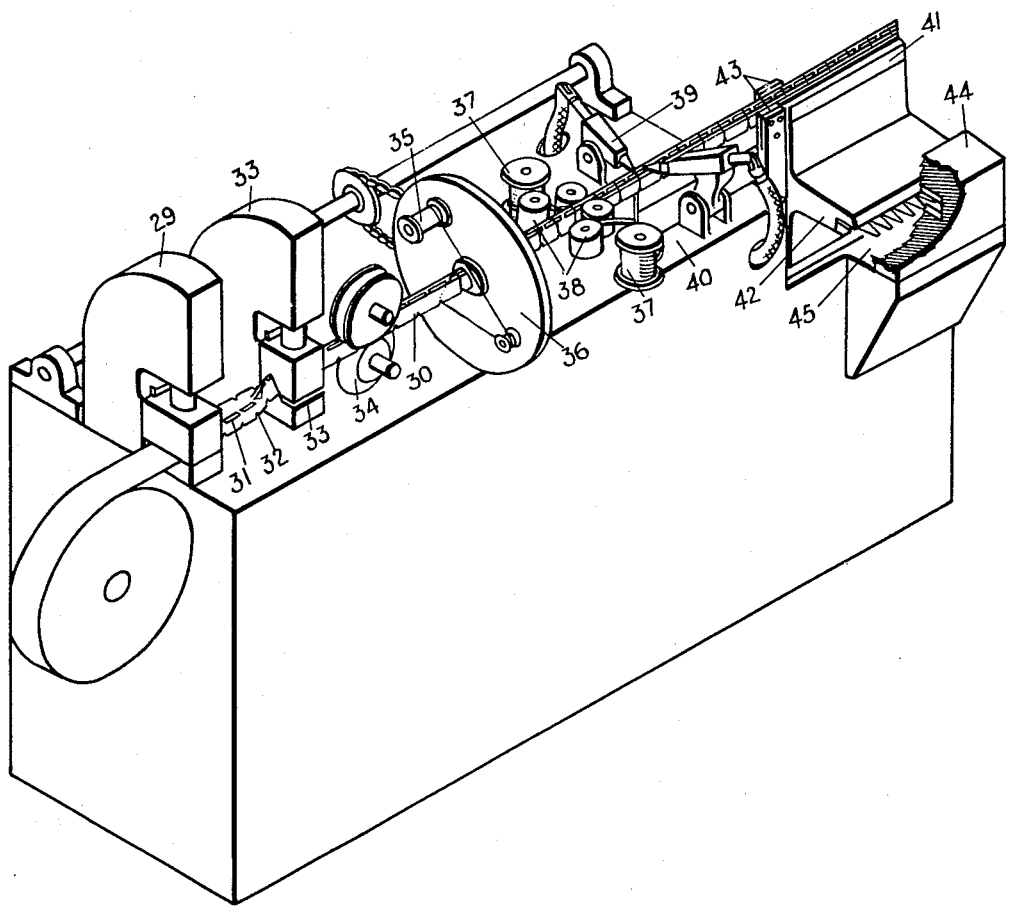

Referring to Figure 9, 29 is a punch in the first operating position and draws through itself a metal strip 30 of tinned sheet $^{13}/_{16}$ inch wide and 0.003 inch thick. The punch 29 punches slots in regular intermittent steps in the metal strip 30 to produce a series of spaced slots 31 whose longitudinal edges which are nearer to a particular edge of the strip 30 are on the longitudinal axis of the metal strip. During the punching operation for the production of the slots 31 acute angled notches 32 are punched on the edges of the metal strip. These notches 32 are so positioned with respect to the slots 31 that there is a notch 32 on each side of a slot 31 and a line joining the apex of each of these two notches bisects the slot at right angles.

The punched strip 30 then enters a series of adjacent dies 33 in a second operating position so that it is folded along its longitudinal axis to an angle of about 45°. The thus bent strip 30 is assisted to the third operating position by means of a pair of shaped feeding rollers 34 which are synchronised with the strip moving mechanism of the punch 29.

In the third operating position a slot 31 is registered in such a position as to enable a thin resistance wire from a reel of such wire 35 to be wound round the bent strip 30 by the rotating mechanism 36 so that the wire is held by two opposing notches 32 and passes across the longitudinal slot 31 at a position intermediate between the ends of said slot, and also underneath the strip 30 and while the strip 30 moves forward a distance equal to that between corresponding portions of successive slots 31 it is passed back to the position from which it started. This cycle for the resistance wire is repeated for the next slot 31 as the strip 30 progresses through this third position.

At the fourth operating position two narrow ribbons of steel wire from the bobbins 37 are laid on the upper surface of the bent metal strip 30 by the two sets of roller feed mechanisms 38 so that each ribbon covers the resistance wire close to and on each side of the slot 31 and is parallel to the longitudinal axis of the metal strip 30. When the metallic strip reaches the heating electrodes 39 each metallic ribbon where it crosses the resistance wire is spot welded to the metallic strip thereby permanently uniting to the metal strip the resistance wire in the form of a bridge across the slot. On leaving this fourth operating position the surplus resistance wire underneath the metal strip 30 is removed.

At a fifth operating position a strip of pressboard 40 with its two surfaces pre-coated with heat-sealing adhesive is introduced into the fold of the bent metal strip 30. The metal strip 30 is then bent to 180° so that the pressboard is sandwiched between the two surfaces of the folded metal strip and the metal strip sandwich thus formed is then passed between one of the four sets of clamping jaws 41 in the rotating star-shaped holder 42. The metal strip sandwich between the clamping jaws 41 is heated by a heating means (not shown) in order to cement the metal strip to the pressboard. As the holder 42 rotates through 90° the length of the thus cemented structure between the clamping jaws 41 is cut off by the knife 43 and is carried into a comb-forming punching machine 44 where it is cut into a comb of wired teeth 45. The comb-forming punching machine 44 is shown half cut away to expose part of the comb 45. After the holder 42 has rotated through a further 90° the clamping jaws 41 open and release the comb of wired teeth 45.

The combs 45 are then dipped in known manner one or more times in a deflagrating composition so that each electric resistance wire on each tooth is embedded in a bead of the deflagrating composition. The beads of deflagrating composition are then dipped into a waterproofing composition so as to provide each bead with a coating of a waterproofing composition. The thus treated combs are then cut so as to give completed fuseheads.

What we claim is:

1. A process for the production of electric fuseheads including two metal foil pole pieces separated by a she of non-conducting material so that a surface of each fc is united to an opposing surface of the sheet of non-co: ducting material and having one end of each metal fc pole piece connected together by an electric resistan( wire which is embedded in a bead of deflagrating con position, said process comprising providing a narrow str: of metal foil conducting material having along its lengt a line of rectangularly evenly spaced slots of substantial: greater length than width parallel to the edges of sa: strip, applying resistance wire to said strip so that tl said wire passes transversely across the top surface ( the strip at a position intermediate between the ends ( each of said spaced slots, securing said resistance wire 1 said strip by means of metallic wire covering the resis ance wire close to and on each side of the slots and a taching said metallic wire to the said strip, bending sa: strip longitudinally and ultimately to about 180 degre( over at least one strip of insulating material to form unitary structure with the material, cutting the tht formed unitary structure into a comb of wired teeth, en bedding the tip of each wired tooth in at least or deflagrating composition and thereafter cutting the tht treated comb into individual fuseheads.

2. A process as claimed in claim 1 wherein the edg( of said metal strip are provided with wire positionir notches so positioned with respect to the slots that thei is a notch on each side of a slot and that a line joinir these two notches bisects the slot at right angles.

3. A process as claimed in claim 1 wherein each of tl spaces of the metal strip between each of the lines whic include the longer edges of the slots and the nearer edg of the strip is covered by an insulating sheet.

4. A process as claimed in claim 1 wherein the step c securing the resistance wire to the said strip compris( positioning a pair of insulated leading wires having bare ends on the upper surface of the strip so that a bared en of each leading wire covers the resistance wire close 1 and on each side of a slot, thereafter attaching the bare ends of the leading wires on at least one point to the met: strip.

5. A process as claimed in claim 1 wherein the step c securing the resistance wire to the said strip compris( positioning two narrow metallic ribbons on the upp( surface of the metal strip after the latter has been bei to an angle of about 45 degrees so that each ribbon covei the resistance wire close to and on each side of the sl( and is parallel to the longitudinal axis of the metal strij thereafter attaching each metallic ribbon where it cross( the resistance wire to the metallic strip.

References Cited in the file of this patent
UNITED STATES PATENTS

| 1,099,589 | Cook | June 9, 191 |
| 1,394,454 | Van Doorn | Oct. 18, 192 |
| 1,407,157 | Jessen | Feb. 21, 192 |
| 1,777,916 | Schaffler-Glossl | Oct. 7, 193 |

FOREIGN PATENTS

| 368,034 | Germany | July 29, 193 |